(12) United States Patent
Chen

(10) Patent No.: US 11,968,035 B1
(45) Date of Patent: Apr. 23, 2024

(54) WAVELENGTH DOMAIN MULTIPLEXING WITH POLARIZATION MULTIPLEXING

(71) Applicant: Acacia Communications, Inc., Maynard, MA (US)

(72) Inventor: Long Chen, Marlboro, NJ (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 17/393,102

(22) Filed: Aug. 3, 2021

(51) Int. Cl.
| | |
|---|---|
| H04J 14/06 | (2006.01) |
| G02B 27/28 | (2006.01) |
| G02F 1/21 | (2006.01) |
| H04B 10/50 | (2013.01) |
| H04B 10/60 | (2013.01) |
| H04J 14/02 | (2006.01) |

(52) U.S. Cl.
CPC ............ *H04J 14/06* (2013.01); *G02B 27/283* (2013.01); *G02B 27/286* (2013.01); *G02F 1/212* (2021.01); *H04B 10/50* (2013.01); *H04B 10/60* (2013.01); *H04J 14/02* (2013.01)

(58) Field of Classification Search
CPC ........ H04J 14/06; H04J 14/02; H04J 14/0208; H04J 14/0209; H04J 14/0261; G02F 1/212; G02F 1/21; G02B 27/283; G02B 27/286; G02B 6/272; G02B 6/2766; G02B 6/2935; G02B 6/29353; G02B 6/29386; H04B 10/50; H04B 10/60; H04B 10/506; H04B 10/505; H04B 10/5051; H04B 10/5053; H04B 10/5055; H04B 10/503

See application file for complete search history.

(56) References Cited

U.S. PATENT DOCUMENTS

| | | | |
|---|---|---|---|
| 2011/0150471 A1* | 6/2011 | Joyner ................. | H04B 10/506 398/58 |
| 2018/0205197 A1* | 7/2018 | Zimer .................. | H01S 5/4062 |
| 2018/0270010 A1* | 9/2018 | Troeltzsch ............. | H04J 14/06 |
| 2020/0319409 A1* | 10/2020 | Su ....................... | G02B 6/12007 |

* cited by examiner

*Primary Examiner* — Hibret A Woldekidan
(74) *Attorney, Agent, or Firm* — K&L Gates LLP

(57) ABSTRACT

In part, in one aspect, the disclosure relates to a system including an integrated optical multiplexer. The integrated optical multiplexer may include a plurality of optical inputs configured and constructed to receive input optical signals; two or more stages of multiplexing in a cascading configuration, wherein the two or more stages of multiplexing are divided into wavelength stages and a last stage, wherein each of the wavelength stages combine subsets of input optical signals by wavelength, the last stage combines input optical signals by polarization using a polarization beam combiner, and at a combined output of the integrated optical multiplexer a first subset of the input optical signals have a different polarization than a second subset of the input optical signals.

16 Claims, 4 Drawing Sheets

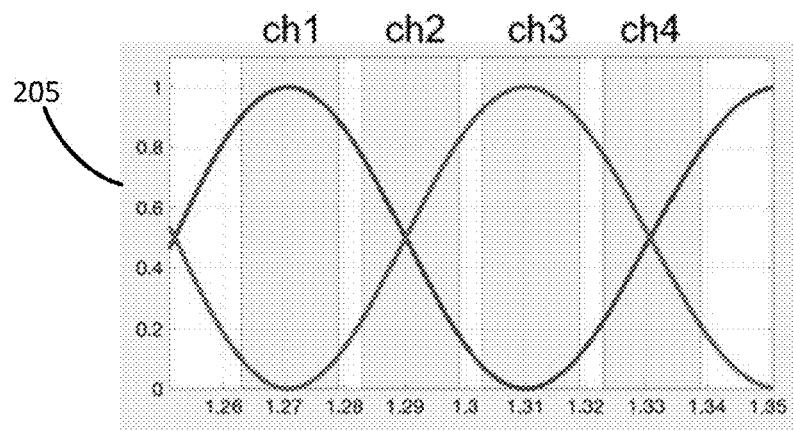
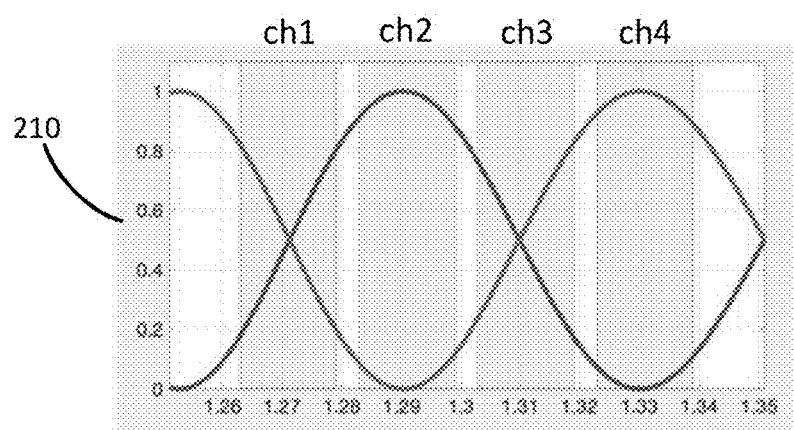
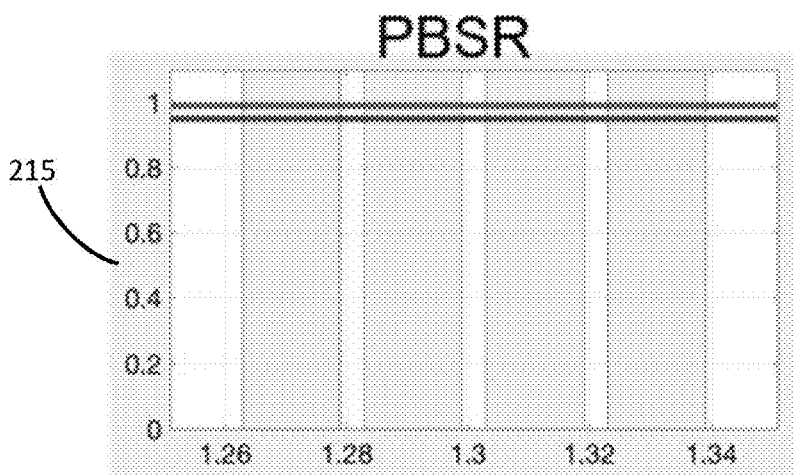
Fig. 2

WAVELENGTH DOMAIN MULTIPLEXING WITH POLARIZATION MULTIPLEXING

FIELD

This disclosure relates generally to the field of photonic circuits such as photonic integrated circuits (PICs).

BACKGROUND

Contemporary optical communications and other photonic systems make extensive use of photonic integrated circuits (PICs) that are advantageously mass-produced in various configurations for various purposes.

SUMMARY

In part, in one aspect, the disclosure relates to a system including an integrated optical multiplexer. The integrated optical multiplexer may include a plurality of optical inputs configured and constructed to receive input optical signals; two or more stages of multiplexing in a cascading configuration, wherein the two or more stages of multiplexing are divided into wavelength stages and a last stage, wherein each of the wavelength stages combine subsets of input optical signals by wavelength, the last stage combines input optical signals by polarization using a polarization beam combiner, and at a combined output of the integrated optical multiplexer a first subset of the input optical signals have a different polarization than a second subset of the input optical signals.

In one embodiment, the polarization beam combiner may also include the polarization rotating function on a second subset of the input signals. In one embodiment, the polarization rotator is incorporated before the first stage of the integrated optical multiplexer. In one embodiment, the polarization rotator is incorporated between stages of the integrated optical multiplexer. In one embodiment, the polarization rotator rotates the second subset of the input optical signals orthogonally from the first subset of input optical signals. In one embodiment, each of the wavelength stages incorporate one or more mach-zehnder interferometers. In one embodiment, the mach-zehnder interferometer has a higher-order delay element to produce a flattened passband.

In one aspect, the disclosure relates to a method of multiplexing signals. The method may include receiving a set of signals including a first subset of signals and a second subset of signals; rotating a polarization of each signal of the second subset of signals; and combining the first subset of signals and the second subset of signals into a single output signal.

In one embodiment, the first subset of signals and the second subset of signals are combined with a polarization beam splitter. In one embodiment, the second subset of signals is rotated with a polarization rotator. In one embodiment, the second subset of signals is rotated orthogonally with respect to the first subset of signals.

In one aspect, the disclosure relates to a system including an optical transmitter. The optical transmitter may include a digital signal processor (DSP) operable to generate a plurality of optical input signals; and an integrated optical multiplexer. The integrated optical multiplexer may include a plurality of inputs operable to receive the plurality of optical input signals, two or more stages of multiplexing in a cascading configuration, wherein the two or more stages of multiplexing are divided into wavelength stages and a last stage, wherein each of the wavelength stages combine subsets of the input signals by wavelength, the last stage combines the optical signals by polarization using a polarization beam combiner, and at a combined output of the integrated optical multiplexer a first subset of the input optical signals have a different polarization than a second subset of the input optical signals.

In one embodiment, the polarization beam combiner also includes the polarization rotating function on a second subset of the input signals. In one embodiment, the polarization rotator is incorporated before the first stage of the integrated optical multiplexer. In one embodiment, the polarization rotator is incorporated between stages of the integrated optical multiplexer. In one embodiment, the polarization rotator rotates the second subset of the input optical signals orthogonally from the first subset of input optical signals. In one embodiment, each of the wavelength stages incorporate one or more mach-zehnder interferometers. In one embodiment, the mach-zehnder interferometer has a higher-order delay element to produce a flattened passband.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, optical paths, waveguides, splitters, couplers, combiners, electro-optical devices, inputs, outputs, ports, channels, components and parts of the foregoing disclosed herein can be used with any laser, laser-based communication system, waveguide, fiber, transmitter, transceiver, receiver, and other devices and systems without limitation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which:

FIG. 2 shows graphs indicating transmission spectra of the two stage multiplexer shown in FIG. 1, according to an embodiment of the disclosure;

DETAILED DESCRIPTION

Figure 1:
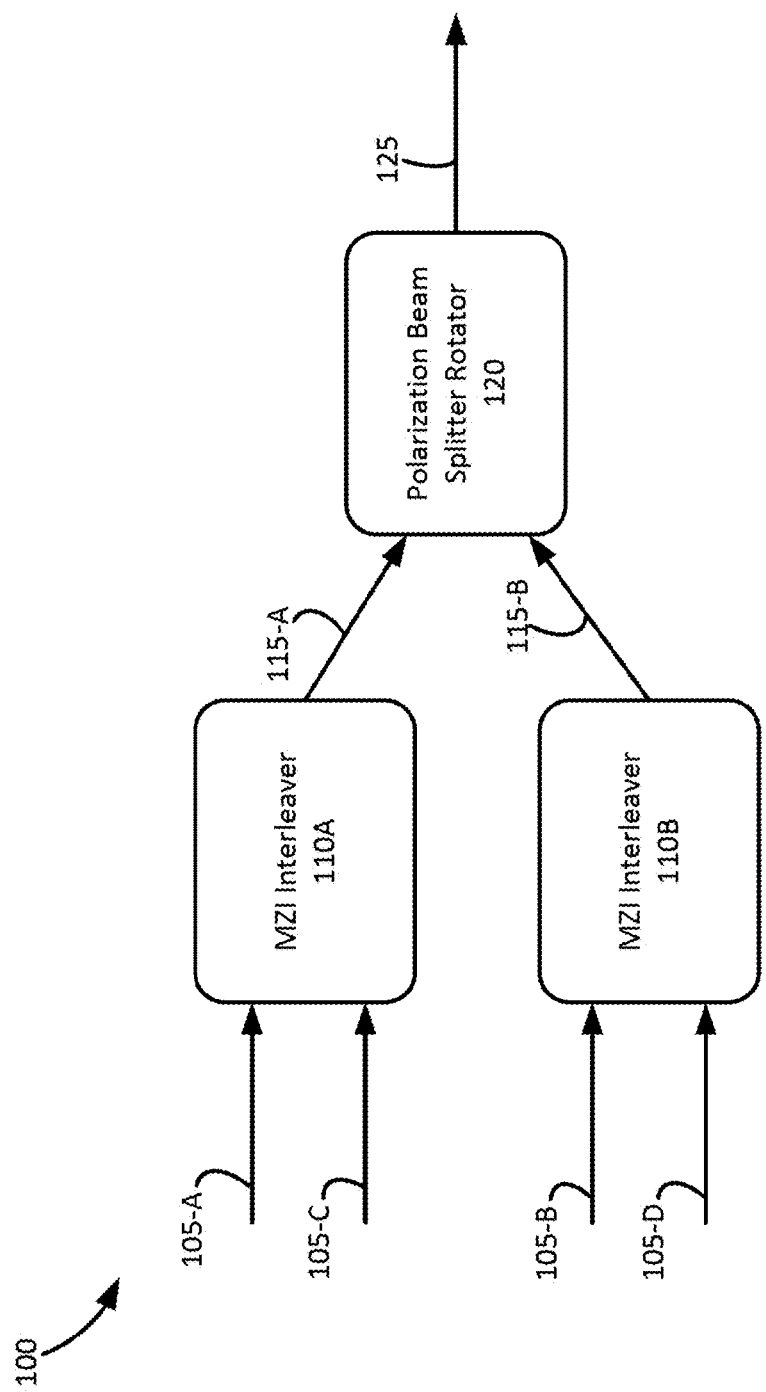
FIG. 1 illustrates an example implementation of a two-stage multiplexer, in accordance with an embodiment of the disclosure.

In many embodiments, the current disclosure may enable the design, creation, and/or implementation a multiplexer for use with a transmitter and/or a transceiver that provides improved performance. Typically, a multiplexer is a device that selects and/or receives several analog or digital input signals and combines the input signals to a single output signal. For example, traditionally, one widely used scheme in optical communications is wavelength domain multiplexing (WDM) where optical signals of different wavelengths/frequencies are combined to propagate in an optical medium such as fiber. Generally, when more than two input signals are involved, multiplexers include two or more stages of multiplexers to combine a plurality of signals into a single output signal. Typically, commonly built and/or used multiplexers in industry incorporate cascading wavelength interleavers, which have wavelength dependent transmission characteristics that are nearly periodic, and could combine a group of wavelengths from one input, and another, complimentary group of wavelengths from the other input. Generally, a widely used wavelength interleaver design is a Mach-Zehnder interferometer (MZI) with two input ports and a certain path length difference between the two interfering arms. Traditionally, from each input to output, the transmission spectrum has a sinusoidal profile with periodic peaks and valleys. Typically, wavelengths to be multiplexed are aligned with transmission peaks with minimum insertion loss. Generally, when signal wavelengths and multiplex transmission peaks are not aligned, excess optical insertion loss incurs, which degrades a transmission link budget or requires the laser to produce higher optical power.

In many embodiments, with respect to wavelength multiplexers, a relative alignment of signal wavelengths and corresponding interleaver multiplexer transmission peaks and associated excess loss may depend on two factors: a variation of a signal wavelength and a shape and variation of an interleaver transmission passband. In various embodiments, lasers providing a source signal may vary around a nominal wavelength target. For example, in some embodiments, uncooled distributed feedback lasers (DFBs) may be used for optical communication. In certain embodiments, a laser wavelength may have an initial range from fabrication. In some embodiments, an initial range of a laser wavelength may vary with the environment temperature where the laser sits in. As a result, various embodiments, such uncooled lasers may be specified to have a wavelength accuracy of +/−about 5.5 nm around its nominal wavelength target, depending on an operating temperature range. Therefore, in many embodiments, a multiplexer may need to provide a broad enough passband. In various embodiments, a multiplexer itself may vary around a nominal wavelength target, as a result of fabrication variations and possibly temperature dependence. For example, in some embodiments, when such an interleaver/multiplexer may be implemented using photonic integrated circuits, the waveguide width and thickness may not be constant, and inherently may vary across a wafer and among wafers. In some embodiments, for example, fabrication/temperature induced variation of a passband may be around +/−about 2.5 nm. Therefore, in many embodiments, a multiplexer may needs to have a sufficiently wide passband to account for both laser wavelength drift and multiplexer wavelength drift. For example, in some embodiments, a multiplexer may require a passband of at least about 10 nm, and in other embodiments, a multiplexer may require a passband of at least about 13 nm, and in yet other embodiments, a multiplexer may require at least 16 nm, to minimize excessive insertion loss.

In some embodiments, a width of the transmission passband of an interleaver-based multiplexer (e.g., a MZI based interleaver) may be proportional to a free spectral range (FSR) of an interleaver. For example, in some embodiments, if an FSR of a regular MZI with a sinusoidal transmission profile is about 80 nm, then its about 3-dB, about 1-dB, about 0.5-dB passband widths may be about 40 nm, about 24 nm, and about 17 nm, respectively. In other embodiments, if a FSR of a MZI includes a sinusoidal transmission profile of 40 nm, then proportionally, its about 3-dB, about 1-dB, about 0.5-dB passband widths may be about 20 nm, about 12 nm, and about 8.5 nm, respectively. In various embodiments, there may be various techniques to flatten an interleaver passbands compared with a sinusoidal profile. For example, in some embodiments, a higher order MZI with multiple delay stages may produce a more square shaped transmission spectrum. However, in these embodiments, such designs may require extra complexity in delay waveguides and optical power couplers.

In various embodiments, multiplexer with cascaded interleavers may use multiple stages with different FSRs. For example, to combine four signals with nominal wavelength spacing of about 20 nm (λ1, λ2, λ3, λ4), in some embodiments, the multiplexer may have two stages. In certain embodiments, a first stage may contain two interleavers, one combining λ1 and λ3, and the other combining λ2 and λ4, both with a FSR of about 80 nm. In some embodiments, a second stage may contain one interleaver, combining the group of λ1 and λ3 with the group of λ2 and λ4, with a FSR of about 40 nm. As illustrated above, in many embodiments, for a given requirement of passband width, for example 16 nm, the first stage with about 80 nm FSR and about 0.5-dB bandwidth of about 17 nm may incur worst-case excess insertion loss below 0.5 dB; the second stage with about 40 nm FSR and about 1-dB bandwidth of about 12 nm may incur worst-case excess insertion loss as much as about 1.8 dB. Therefore, in many embodiments, replacing the second or last stage interleaver multiplexer of a smallest FSR with a different multiplexer with broader passband or smaller wavelength dependent loss may provide value.

In various embodiments, the current disclosure may enable design, creation, and/or implementation of a multi-stage multiplexer operable to reduce and/or minimize insertion loss when mixing or de-mixing signals. In many embodiments, a multi-stage multiplexer may incorporate one or more interleaver stages, and as a last stage, a polarization beam splitter (PBS) stage. In certain embodiments, a PBS may provide a much broader passband and thus lower excessive insertion loss. In some embodiments, different stages may be integrated together using photonic integrated circuits.

In various embodiments, a polarization rotator may be incorporated into a polarization beam splitter (e.g., a two stage multiplexer may use a polarization beam splitter and rotator). In other embodiments, a polarization rotator may be implemented prior to entering a multi-stage multiplexer and applied to half of a set of input signals prior to being multiplexed (e.g., select signal connections may include a polarization rotator). In certain embodiments, a polarization rotator may be implemented between stages of a multi-stage multiplexer. In various embodiments, a combination of an interleaver stage and a polarization beam splitter and rotator stage, within a multiplexer, may result in a lower wavelength-dependent excess insertion loss. In most embodiments, half of the input signals may be output as transverse electric (TE) polarization and half of the input signals may be output as transverse magnetic (TM) polarization.

Refer now to the example embodiment of FIG. 1, which shows an example implementation of a two-stage multiplexer, in accordance with one or more aspects of the disclosure. As shown in FIG. 1, multiplexer 100 is a two stage multiplexer operable to combine and/or mix four input channels (e.g., channel 1 is 105-A, channel 2 is 105-B, channel 3 is 105-C, and channel 4 is 105-D) into a single output channel (e.g., output channel 125, which is a mix and/or combination of all the input channels). In various embodiments, a multiplexer (e.g., multiplexer 100) may be an integrated optical multiplexer. Multiplexer 100 includes MZI interleaver 110A, MZI interleaver 110B, and a polarization beam splitter and rotator (PB SR) 120. In this embodiment, channel 1 (105-A) and channel 3 (105-C) are interleaved by MZI interleaver 110A and output in channel 115-A. Channel 2 (105-B) and channel 4 (105-D) are interleaved by MZI interleaver 110B and output in channel 115-B. Channel 115-A and channel 115-B are input to the polarization beam splitter rotator 120, which rotates the signal transmitted across channel 115-B and then combines and/or mixes the rotated signal received from channel 115-B with an un-rotated signal received from channel 115-A. Subsequently, a combined and/or mixed signal is output via channel 125.

Refer now to the example embodiment of FIG. 2, which show graphs indicating transmission spectra of the two stage multiplexer shown in FIG. 1, in accordance with one or more aspects of the disclosure. As shown in FIG. 2, graph 205 indicates transmission spectra of the interleaver 110A in FIG. 1, from channel 105-A in FIG. 1 to channel 115-A in FIG. 1 for the wavelength signal of ch1, and from channel 105-C in FIG. 1 to channel 115-A in FIG. 1 for the wavelength signal of ch3. Graph 210 indicates transmission spectra of the interleaver 110B in FIG. 1, from channel 105-B in FIG. 1 to channel 115-B in FIG. 1 for the wavelength signal of ch2, and from channel 105-D in FIG. 1 to channel 115-B in FIG. 1 for the wavelength signal of ch4. Graph 215 shows transmission spectra of the PBSR 120 in FIG. 1, from channel 115-A to channel 125, and from channel 115-B to channel 125 in FIG. 1. The PBSR shows nearly flat, low loss, transmission performance for the entire wavelength range of interest, therefore allowing multiplexing ch1, ch2, ch3, ch4 together with low excess insertion loss.

Figure 3:
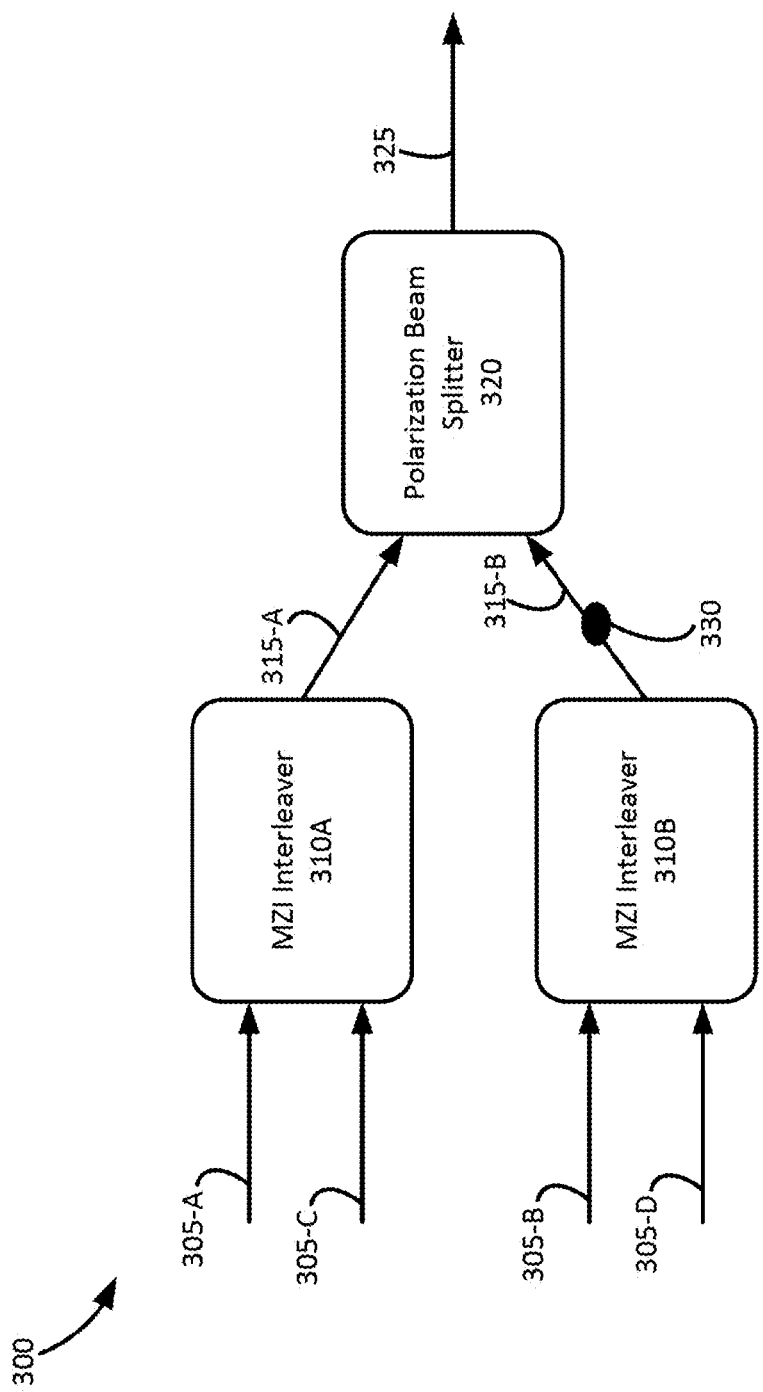
FIG. 3 illustrates an alternative example embodiment of a two-stage multiplexer, in accordance with an embodiment of the disclosure.

Refer now to the example embodiment of FIG. 3, which shows an alternate example embodiment of a two-stage multiplexer, in accordance with one or more aspects of the disclosure. As shown in FIG. 3, multiplexer 300 is a two stage multiplexer operable to combine and/or mix four input channels (e.g., channel 1 is 305-A, channel 2 is 305-B, channel 3 is 305-C, and channel 4 is 305-D) into a single output channel (e.g., output channel 325, which is a mix and/or combination of all the input channels). Multiplexer 300 includes mach-zehnder interferometer (MZI) interleaver 310A, MZI interleaver 310B, a polarization beam splitter (PBS) 320, and polarization rotator 330. In this embodiment, channel 1 (305-A) and channel 3 (305-C) are interleaved by MZI interleaver 310A and output in channel 315-A. Channel 2 (305-B) and channel 4 (305-D) are interleaved by MZI interleaver 310B and output in channel 315-B. Signals sent via Channel 315B are rotated by polarization rotator 330. Signals received over channel 315-A and channel 315-B (i.e., signals rotated by polarization rotator 330) are inputs to the polarization beam splitter 320, which combines and/or mixes the rotated signal received from channel 315-B with an un-rotated signal received from channel 315-A. Subsequently, a combined and/or mixed signal is output via channel 325.

Figure 4:
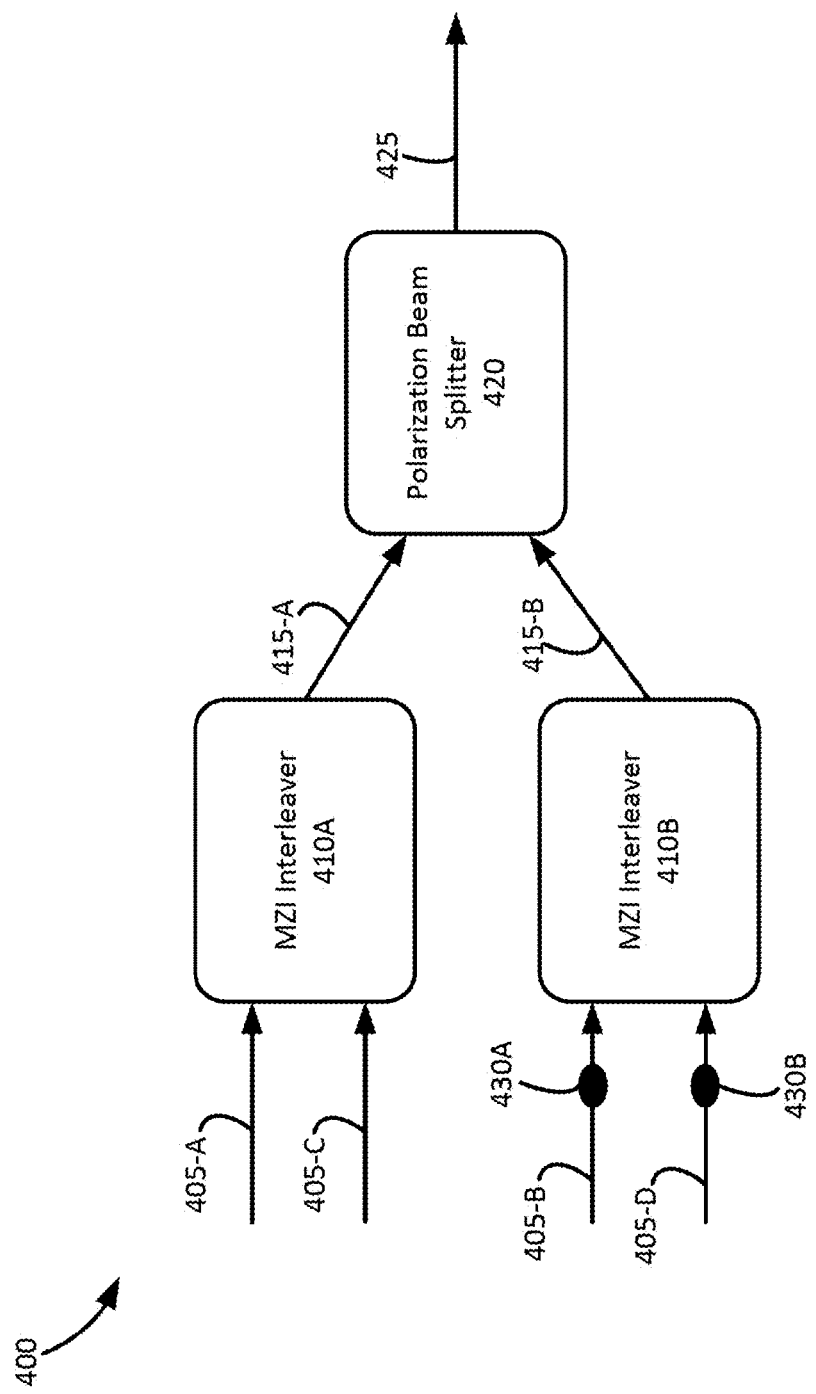
FIG. 4 illustrates yet another alternate example embodiment of a two-stage multiplexer, in accordance with an embodiment of the disclosure.

Refer now to the example embodiment of FIG. 4, which shows yet another alternate example embodiment of a two-stage multiplexer, in accordance with one or more aspects of the disclosure. As shown in FIG. 4, multiplexer 400 is a two stage multiplexer operable to combine and/or mix four input channels (e.g., channel 1 is 405-A, channel 2 is 405-B, channel 3 is 405-C, and channel 4 is 405-D) into a single output channel (e.g., output channel 425, which is a mix and/or combination of all the input channels). Multiplexer 400 includes mach-zehnder interferometer (MZI) interleaver 410A, MZI interleaver 410B, a polarization beam splitter (PBS) 420, and polarization rotators 430A and 430B. In this embodiment, channel 1 (405-A) and channel 3 (405-C) are interleaved by MZI interleaver 410A and output in channel 415-A. Signals received via Channel 2 (405-B) and channel 4 (405-D) are rotated by polarization rotators 430A and 430B prior to being input into MZI Interleaver 410B. Channel 2 (405-B) and channel 4 (405-D), which at this point have their polarization rotated, are interleaved by MZI interleaver 410B and output in channel 415-B. Signals received over channel 415-A and channel 415-B are inputs to the polarization beam splitter 420, which combines and/or mixes the rotated signal received from channel 415-B with an un-rotated signal received from channel 415-A. Subsequently, a combined and/or mixed signal is output via channel 425. The output signal received on channel 425 includes little to no insertion loss due to multiplexing signals.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor (DSP). In certain embodiments, one or more of the embodiments herein may be executed on a DSP. One or more of the embodiments herein may be programmed into a DSP. In some embodiments, a DSP may have one or more processors and one or more memories. In certain embodiments, a DSP may have one or more computer readable storages. In many embodiments, a DSP may be a custom designed ASIC chip. In other embodiments, one or more of the embodiments stored on a computer readable medium may be loaded into a processor and executed.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. A system, comprising:
an integrated optical multiplexer, comprising:
a plurality of optical inputs configured and constructed to receive input optical signals;
two or more stages of multiplexing in a cascading configuration, wherein the two or more stages of multiplexing are divided into wavelength stages and a last stage, and
a polarization beam combiner,
wherein each of the wavelength stages combine subsets of input optical signals by wavelength, the last stage combines input optical signals by polarization using the polarization beam combiner, and at a combined output of the integrated optical multiplexer a first subset of the input optical signals have a different polarization than a second subset of the input optical signals, wherein one or more components of the integrated optical multiplexer are a polarization rotator or the polarization beam combiner is configured to perform a polarization rotating function, wherein each of the wavelength stages comprises one or more mach-zehnder interferometers, wherein at least one of the mach-zehnder interferometers is configured to flatten a passband.

2. The system of claim 1, where the polarization beam combiner is configured to further perform the polarization rotating function on a second subset of the input signals.

3. The system of claim 1, further comprising the polarization rotator, wherein the polarization rotator is incorporated before the first stage of the integrated optical multiplexer.

4. The system of claim 1, further comprising the polarization rotator, wherein the polarization rotator is incorporated between stages of the integrated optical multiplexer.

5. The system of claim 1, further comprising the polarization rotator, wherein the polarization rotator rotates the second subset of the input optical signals orthogonally from the first subset of input optical signals.

6. A method of multiplexing signals, the method comprising:
receiving a set of signals including a first subset of signals and a second subset of signals;
rotating a polarization of each signal of the second subset of signals;
combining, using one or more of mach-zehnder interferometers, the first subset of signals and the second subset of signals into a single output signal; and
flattening a passband using a delay element of one or more mach-zehnder interferometers, wherein one or more of the rotating and combining steps are configured to reduce wavelength-dependent excess insertion loss.

7. The method of claim 6, wherein the first subset of signals and the second subset of signals are combined with a polarization beam splitter.

8. The method of claim 6, wherein the second subset of signals are rotated with a polarization rotator.

9. The method of claim 6, wherein the second subset of signals are rotated orthogonally with respect to the first subset of signals.

10. A system, comprising:
an optical transmitter, comprising:
a digital signal processor (DSP); and
an integrated optical multiplexer, comprising:
a photonic integrated circuit comprising
a plurality of inputs operable to receive a plurality of optical input signals, and
two or more stages of multiplexing in a cascading configuration, wherein the two or more stages of multiplexing are divided into wavelength stages and a last stage,
wherein each of the wavelength stages combine subsets of the input signals by wavelength, the last stage combines the optical signals by polarization using a polarization beam combiner, and at a combined output of the integrated optical multiplexer a first subset of the input optical signals have a different polarization than a second subset of the input optical signals, wherein one or more of the wavelength stages comprise one or more mach-zehnder interferometers, wherein at least one of the mach-zehnder interferometers is configured to flatten a passband.

11. The system of claim 10, where the polarization beam combiner is configured to perform a polarization rotating function on a second subset of the input signals.

12. The system of claim 10, further comprising a polarization rotator, wherein the polarization rotator is incorporated before the first stage of the integrated optical multiplexer, wherein the polarization rotator is configured to reduce wavelength-dependent excess insertion loss.

13. The system of claim 10, further comprising a polarization rotator, wherein the polarization rotator is incorporated between stages of the integrated optical multiplexer, wherein the polarization rotator is configured to reduce wavelength-dependent excess insertion loss.

14. The system of claim 10, further comprising a polarization rotator, wherein the polarization rotator rotates the second subset of the input optical signals orthogonally from the first subset of input optical signals.

15. The system of claim 10, wherein each of the wavelength stages incorporate one or more mach-zehnder interferometers.

16. A system comprising:
an integrated optical multiplexer, comprising:
a plurality of optical inputs configured and constructed to receive input optical signals;
two or more stages of multiplexing in a cascading configuration, wherein the two or more stages of multiplexing are divided into wavelength stages and a last stage; and
a polarization beam combiner,
wherein each of the wavelength stages combine subsets of input optical signals by wavelength, the last stage combines input optical signals by polarization using the polarization beam combiner, and at a combined output of the integrated optical multiplexer a first subset of the input optical signals have a different polarization than a second subset of the input optical signals, wherein one or more of the wavelength stages comprise one or more mach-zehnder interferometers, wherein at least one of the mach-zehnder interferometers is configured to flatten a passband.

\* \* \* \* \*